US010378720B2

(12) United States Patent
Ashley

(10) Patent No.: US 10,378,720 B2
(45) Date of Patent: Aug. 13, 2019

(54) SAFETY LIGHTING SYSTEM

(71) Applicant: Aubrey Shane Ashley, Pecos, TX (US)

(72) Inventor: Aubrey Shane Ashley, Pecos, TX (US)

( * ) Notice: Subject to any disclaimer, the term of this patent is extended or adjusted under 35 U.S.C. 154(b) by 0 days.

(21) Appl. No.: 15/836,749

(22) Filed: Dec. 8, 2017

(65) Prior Publication Data

US 2019/0178463 A1     Jun. 13, 2019

(51) Int. Cl.

| B60Q 1/00 | (2006.01) |
|---|---|
| F21S 43/19 | (2018.01) |
| B60Q 1/46 | (2006.01) |
| B60Q 1/44 | (2006.01) |
| F21S 43/14 | (2018.01) |
| F21V 21/088 | (2006.01) |
| B60Q 1/34 | (2006.01) |
| F21W 107/10 | (2018.01) |
| F21W 103/20 | (2018.01) |
| F21W 103/30 | (2018.01) |
| F21W 103/35 | (2018.01) |

(52) U.S. Cl.
CPC .......... *F21S 43/195* (2018.01); *B60Q 1/0035* (2013.01); *B60Q 1/0076* (2013.01); *B60Q 1/0088* (2013.01); *B60Q 1/343* (2013.01); *B60Q 1/44* (2013.01); *B60Q 1/46* (2013.01); *F21S 43/14* (2018.01); *F21V 21/088* (2013.01); *B60Q 2900/10* (2013.01); *F21W 2103/20* (2018.01); *F21W 2103/30* (2018.01); *F21W 2103/35* (2018.01); *F21W 2107/10* (2018.01)

(58) Field of Classification Search
CPC .................................................... F21S 43/195

USPC ......................................... 362/485, 487, 500
See application file for complete search history.

(56) References Cited

U.S. PATENT DOCUMENTS

| 4,947,293 A | 8/1990 | Johnson et al. |
|---|---|---|
| 5,428,512 A | 6/1995 | Mouzas |
| 5,682,138 A | 10/1997 | Powell et al. |
| 5,712,618 A | 1/1998 | McKenna |
| 6,018,295 A | 1/2000 | Jewel et al. |
| 6,422,725 B1 | 7/2002 | Fong |
| 6,422,728 B1 | 7/2002 | Riggin |
| 6,768,933 B2 | 7/2004 | Serezat |
| 6,910,788 B2 | 6/2005 | Jones |
| 7,002,458 B2 | 1/2006 | Su |
| 7,868,555 B2 | 1/2011 | Peron et al. |
| 8,770,809 B2 | 7/2014 | Kiser |

(Continued)

*Primary Examiner* — Allyson N Trail
(74) *Attorney, Agent, or Firm* — Suzanne Kikel

(57) ABSTRACT

A safety lighting system is connected to a hazard flasher or blinker system of a vehicle, such as a semi-tractor trailer. The system comprises an electrical circuitry for connecting the safety lighting system to the hazard flasher system, brake lights, and/or turn signals for activation of the safety lighting system when the flasher system, brake lights, and/or turn signals are activated. An LED is mounted in a trapezoidal shaped hood of a housing assembly and its illumination is reflected by a reflective inner surface of the hood and directed towards the wheel assemblies of the vehicle to provide adequate lighting around the area surrounding the wheel assemblies. A mounting frame assembly supports the housing assembly and LED for their positioning underneath the vehicle and attachment near the wheel assemblies. In a further embodiment, bolts may be used to attach the housing assembly and LED to the vehicle near the wheels.

10 Claims, 14 Drawing Sheets

(56) References Cited

U.S. PATENT DOCUMENTS

| | | | |
|---|---|---|---|
| 2004/0264207 A1* | 12/2004 | Jones | B60Q 1/326 |
| | | | 362/500 |
| 2008/0259621 A1* | 10/2008 | Peron | B60Q 1/2615 |
| | | | 362/487 |
| 2011/0018441 A1* | 1/2011 | Tanaka | B60Q 1/0094 |
| | | | 315/82 |
| 2011/0181185 A1* | 7/2011 | Day | B60Q 1/2615 |
| | | | 315/77 |
| 2015/0203026 A1 | 7/2015 | Schotanus | |
| 2017/0210282 A1* | 7/2017 | Rodriguez Barros | G03B 21/00 |

* cited by examiner

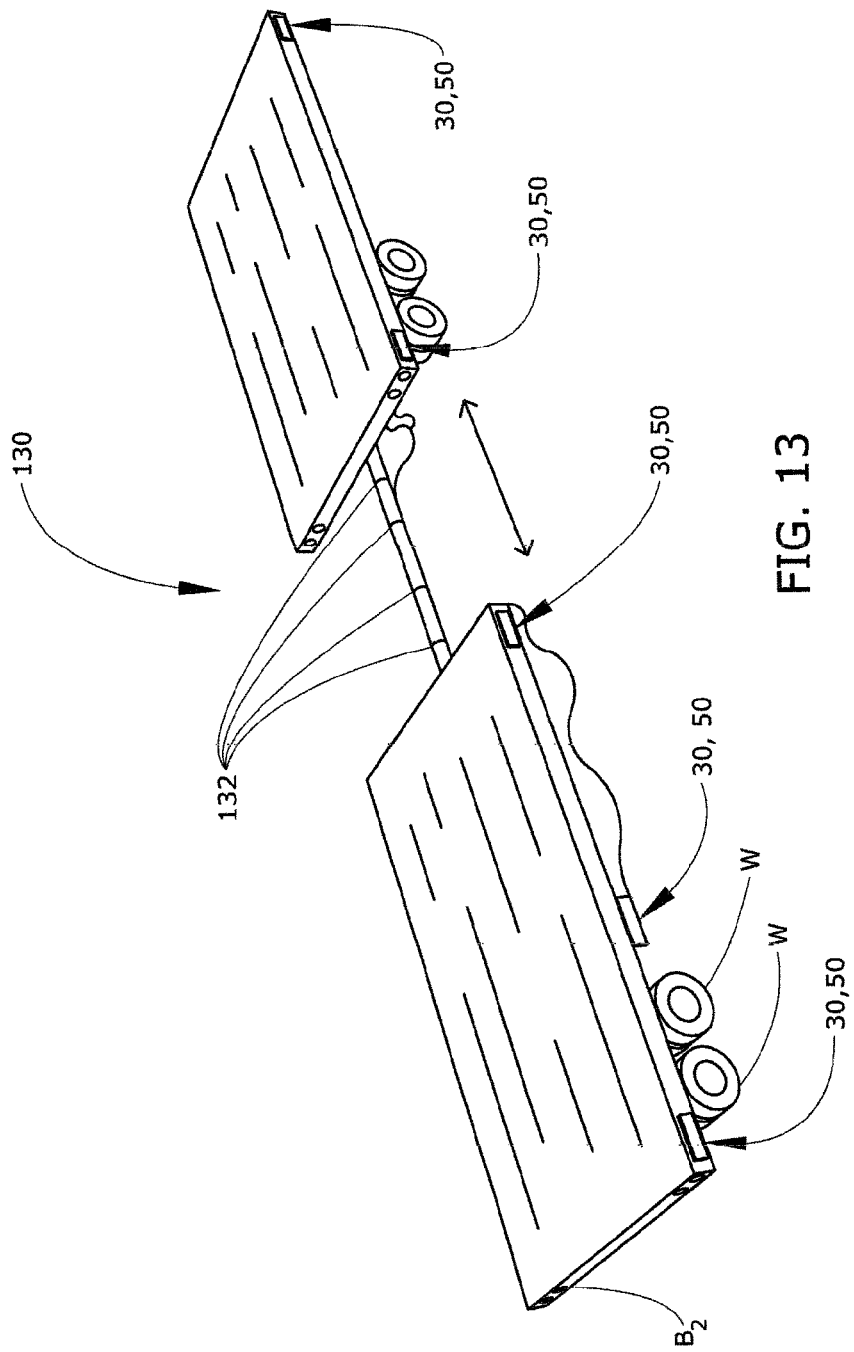

SAFETY LIGHTING SYSTEM

BACKGROUND OF THE INVENTION

1. Field of the Invention

The present invention relates to a safety lighting system for particular application in conjunction with a vehicle's existing lighting system in order to improve the visibility of large vehicles through an intense field of light from one or more light sources particularly adapted for use at one or more locations along the vehicle's sides, rear axle area, and the rearmost body corners. The light sources of the safety lighting system of the invention create an early-warning, and one or more sets of lights of the safety lighting system may be mounted on the underside of the vehicle so as to illuminate the ground under and around the wheel assemblies of the vehicle.

2. Brief Description of the Prior Art

Devices which aid a driver in viewing regions surrounding a car or truck are well known in the art. More specifically, automobile manufacturers equip vehicles with features such as side and rear view mirrors to allow drivers to view other vehicles which are located beside or behind their vehicle. While side view and rear view mirrors are helpful for viewing nearby vehicles, it is nevertheless difficult for drivers to judge the distance of their vehicles from another vehicle by only looking into the mirror. As such, drivers are often not sure whether it is safe to change lanes. This problem is increased when the vehicle being driven is a truck with a long tractor trailer attached thereto. This depth perception problem is further compounded at night.

Commercial vehicles with a tractor and a trailer are particularly difficult to maneuver especially when turning or backing up in terms of seeing the rear wheel assemblies. Oftentimes, the wheels roll up and over the curb and/or other obstacles, resulting in tire damage and/or content damage as a result of a load shift in the trailer.

In order to avoid the aforementioned problem, an illumination system is provided described in U.S. Pat. No. 5,682,138 entitled "Illumination System for A Semi-Trailer or The Like". The solution described in this patent provides a flood lamp positioned rearward of each rear wheel assembly. The flood lamp projects light from behind the wheels toward the curb and ground adjacent to the wheels. The flood lamp is activated when the respective turn signal is used but only when the tail lights are on. Accordingly, whenever the vehicle turns right, a flood lamp illuminates on the right side of the trailer and when the vehicle turns left, a flood lamp illuminates on the left side of the trailer. This system allows the driver to see the ground behind and alongside the rear wheels, but does not allow the driver to see directly in front of the wheels which still remain in the dark.

A further problem with this method of illuminating the rear wheels as described in the aforesaid U.S. Pat. No. 5,682,138 is that the flood lamp is positioned to shine outwardly and while clearly illuminating the curb, this arrangement of the flood lamp and its illumination tends to be blinding to others, especially cars in cross traffic when the trailer makes a left hand turn and to some lesser degree blinds the truck driver since the light beam bounces off of the truck driver's mirror. Furthermore, the illumination system of this '138 patent places the lamps in a position that allow stones to be propelled from the tread of the rear wheels and directly onto the lamps.

Accordingly, it is an object of the present invention to provide an improved lighting system associated with the wheel assemblies of a vehicle which illuminates the ground along the outboard side of the wheel assemblies in front of the tires and behind the tires while at the same time avoiding any blinding glare.

It is a further object of the present invention to provide a safety lighting system for a vehicle that is versatile and which can be used on different types of vehicles, and which safety lighting system can be used in association with the rear wheel assemblies and/or with the front wheel assemblies.

The instances of contact and subsequent damage or injury caused by the rear area of lengthy or larger vehicles in particular, whether in traffic or at other times of operation has long been an area of heightened concern and study. This problem stems from the simultaneous difficulty on the part of both the driver and persons proximate in ascertaining the position and pathway of the trailing portion of the vehicle especially at night and in darkness.

Current solutions include side or rear mounted cameras that help to eliminate blind-spots during a lane change, or illuminated side mirrors on automobiles that create a well-lit safety zone for entry into the vehicle while a bright signal flash alerts motorists and others. Additionally, special lanes for bicyclists have been adopted and large "right turn" warning signs on the rear parts of lengthy vehicles have been utilized. Due to collisions with the sides of tractor-trailers in poor visibility, it has become mandatory to use reflective tape along the sides of such vehicles. These efforts are directed to increasing visual awareness and preventing accidents. Yet, to a large degree, problems still remain. While these examples of the prior art are creative and effective to a point, there still remains the problem of the inability of the driver to visually ascertain the position and pathway of the rear axle wheels, the sides, and the rear of these lengthy vehicles when in total darkness and/or poor visibility, which are conditions in which these unfortunate accidents are likely to occur.

The problems discussed herein above may also be faced by a city bus driver who is presented with challenges in addition to those discussed herein above when navigating the bus through city traffic. The driver must operate with the interior lights illuminated during the night, resulting in a great deal of glare inside the bus since the glass reflects the light. Add to this the presence of a random bicyclist passing unexpectedly in addition to the constant interaction of moving pedestrians, some of which are distracted, and the bus driver has an unpredictable and potentially dangerous situation. Here again, the present day lighting systems which are provided along the sides of the bus make the side areas brightly lit, thereby enabling the driver to clearly see everything along the sides of the bus as visible through the rear-view mirrors.

Accidents between buses and pedestrians and/or bicyclists occur fairly often nationwide. A lack of precise visual identification of the trailing portion of the vehicle and the rear wheels makes it easy for both the driver and the pedestrian at the curb to be simultaneously caught unaware of the position of the other relative to the position of the approaching off-tracking rear axles. During a turn, the driver may think the way is clear because it appeared so in his mirrors. The driver cannot see details and may miscalculate the turn due to the lack of light, or fail to see the person who has stepped into the path of the vehicle just as the rear of the vehicle completes the turn. A proper illumination system may improve the response time of the driver and thus improve safety in this area.

There is, therefore, a need in the art to provide a proper illumination system for the types of vehicles discussed in the preceding paragraphs.

There is a still further need in the art to provide a safety lighting system that projects a light beam onto the roadway adjacent to the vehicle being driven which provides the vehicle driver and others a visual line of reference for the path of the driven vehicle.

And yet, a still further need in the art is to provide a safety lighting system that is connected to a blinker or hazard flasher system of a vehicle, such as a semi-tractor trailer, wherein the lights receive their power from the electrical circuit of the blinker or hazard flasher system of the vehicle and which safety lighting system may alternately be activated when the turn signals, and/or the brake lights, and/or the flasher system are activated.

SUMMARY OF THE INVENTION

The present invention provides such a safety lighting system for a vehicle. The invention provides an improved safety lighting system for a vehicle which is interconnected to a blinker or hazard flasher system of the vehicle, such as, for example a semi-tractor trailer. The lights of the lighting system of the invention are activated when the blinker system of the vehicle is activated. The safety lighting system of the invention comprises an electrical circuitry for connecting the blinker or hazard flasher system to the safety lighting system for activation of the safety lighting system when the hazard flasher system is activated, and a housing assembly for housing a light generating element, such as, for example, a light emitting diode (LED). The housing assembly comprises a hood in the shape of a trapezoidal prism. The hood has a reflective inner surface; a first leg which may be mounted on the vehicle which may be adjacent to a wheel assembly of the vehicle; a first base having a proximal end connected to the first leg; a distal end spaced apart from the first leg; and a second leg having a first end connected to the distal end of the first base and which extends at an angle with respect to the first leg. The second leg has a second end spaced apart from the first base and the spaced apart distal ends of the first base and the second base define an opening in the housing assembly. A light-generating element is mounted in the hood of the housing assembly and is interconnected to existing electrical circuitry of the vehicle for activation thereof when the blinker or hazard flasher system is activated, the light from the illumination of the light-generating element being reflected by the reflective inner surface of the hood and directed out of the opening of the housing assembly and towards the vehicle's wheel assemblies. The construction of the housing assembly and the light-generating element, that is, the use of an LED light source, in general, provide a weather resistant light source for the invention. In other embodiments of the invention, the light-generating element may be interconnected to the electrical circuitry of the turn signals and/or brake lights.

In an embodiment of the invention, a mounting frame assembly is utilized to support the housing assembly and light-generating element of the invention. The mounting frame assembly is structured so as to position the safety lighting system underneath the vehicle and on an axle in proximity to the wheel assembly of the vehicle. The mounting frame assembly comprises at least two concave sleeves each structured to rest on an axle of the vehicle; a clamping assembly for attaching the concave sleeves to an axle of the vehicle; at least two support riser elements, each support riser element being associated with one of the concave sleeves; and an outrigger arm associated with each support riser element and having a proximal end mounted to its associated support riser element and structured to extend beneath a lower surface of the vehicle and toward the wheel assembly of the vehicle, each outrigger arm having a distal end located adjacent to the wheel assembly of the vehicle. The housing assembly and its associated light-generating element are mounted on the distal end of each outrigger arm for directing light downwardly toward the wheel assembly of the vehicle and onto the ground.

In a further embodiment of the invention, a plurality of bolts are utilized to attach the housing assembly and its associated light-generating element to a side panel of the vehicle and/or to additional strategic locations on an underside of the tractor trailer or on the vehicle in order to provide adequate illumination for determining the positioning or location of the wheel assemblies relative to the ground. The light-generating element may be comprised of a light emitting diode (LED).

The present invention provides an improved safety lighting system as pertaining to vehicular operation by supplying an intense field of light from one or more light sources particularly adapted for use at one or more locations along the vehicle's sides, rear axle area, and the rearmost body corners. The light sources thereby create early-warning and increased safety zone by adequate illumination so that the driver may visually ascertain and identify, by means of the side rear-view mirrors, the road surface and area proximate to such, in order to avoid objects or persons proximate. At the same time, the illumination also indicates to persons proximate the precise position and pathway of the body sides, wheels and or rear portion of the vehicle in order to avoid accidental contact.

More specifically, the invention contemplates a lighting product for semi-trailers and utility trailers. The lighting system of the present invention operates in conjunction with already installed turn signals, flashers, and/or brakes on semi-trailers, such as 48'-53' semi-trailers. The lighting system is used to enhance a driver's view of the trailer tires and the area around them when looking in the mirror during a lane change. The tire area is one of the farthest points from the driver's seat. Even though the lighting system of the invention is disclosed in conjunction with semi-trailers, it could also be used on a variety of utility trailers. It can be fitted onto any trailer, small or large, as well as onto campers, recreational vehicles, and the like.

Unlike the traditional role of headlights which are employed to illuminate what is ahead, the present invention may be employed to improve safety by illuminating the dark areas on the road surface and peripheral space that is within the pathway or zone of the sides, rear or trailing portion of a vehicle. The areas illuminated include all or part of the rear axle area proximate to the wheels, the sides, and the end portion of the body or framework of the vehicle. The illumination from the lighting system of the invention is intended to be sufficient to the point that the driver may make adequate visual assessment of the areas via the side mounted rear-view mirrors, and also sufficient that persons proximate are clearly alerted to the vehicle's position and pathway.

In an embodiment of the invention, the safety lighting system may be interconnected to the electrical circuitry of the existing blinkers or flashers of the vehicle for power. That is, the lights require only wire, relays, and simple electrical components in order to operate. The electrical components of the electrical circuitry are protected by a simple weatherproof electrical junction box.

In an embodiment of the invention, the lights of the safety lighting system of the invention may illuminate a 2 to 3 foot circular span along the ground for added vision. When the 4-way flashers of the vehicle are activated, both sides of the vehicle containing the safety lighting system of the invention with one or more LEDs, will light up. Since, in general, trailers do not have backing up lights the driver of the vehicle will activate the LEDs of the invention as an alert to other drivers when backing up via the use of the blinker or hazard flasher system of the vehicle.

More specifically, the safety lighting system of the present invention achieves the desired illumination using one or more weather resistant light sources specially mounted onto or integrated into the vehicle's body or framework and positioned in such a way as to provide the intense field of illumination projected generally downward with peripheral illumination onto the road surface in the desired areas.

One or more methods for controlling or activating the safety lighting system of the invention can be utilized separately or jointly. Actuation may be initiated in conjunction with a turn signal or hazard flasher circuit when either is in operation. In this configuration a controller/relay supplies power to the safety lighting system light sources via a direct current line from the vehicle battery or by an alternative constant power supply source (most likely the marker light or headlamp circuit) once the controller has been "triggered" by the use of the turn signal or hazard flashers.

These and other features and advantages of the present invention will be better appreciated and understood when the following description is read along with the accompanying drawings.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

FIG. 13 is a perspective schematic view of a heavy-haul trailer incorporating the safety lighting system of the invention.

DETAILED DESCRIPTION OF THE INVENTION

Figure 1:
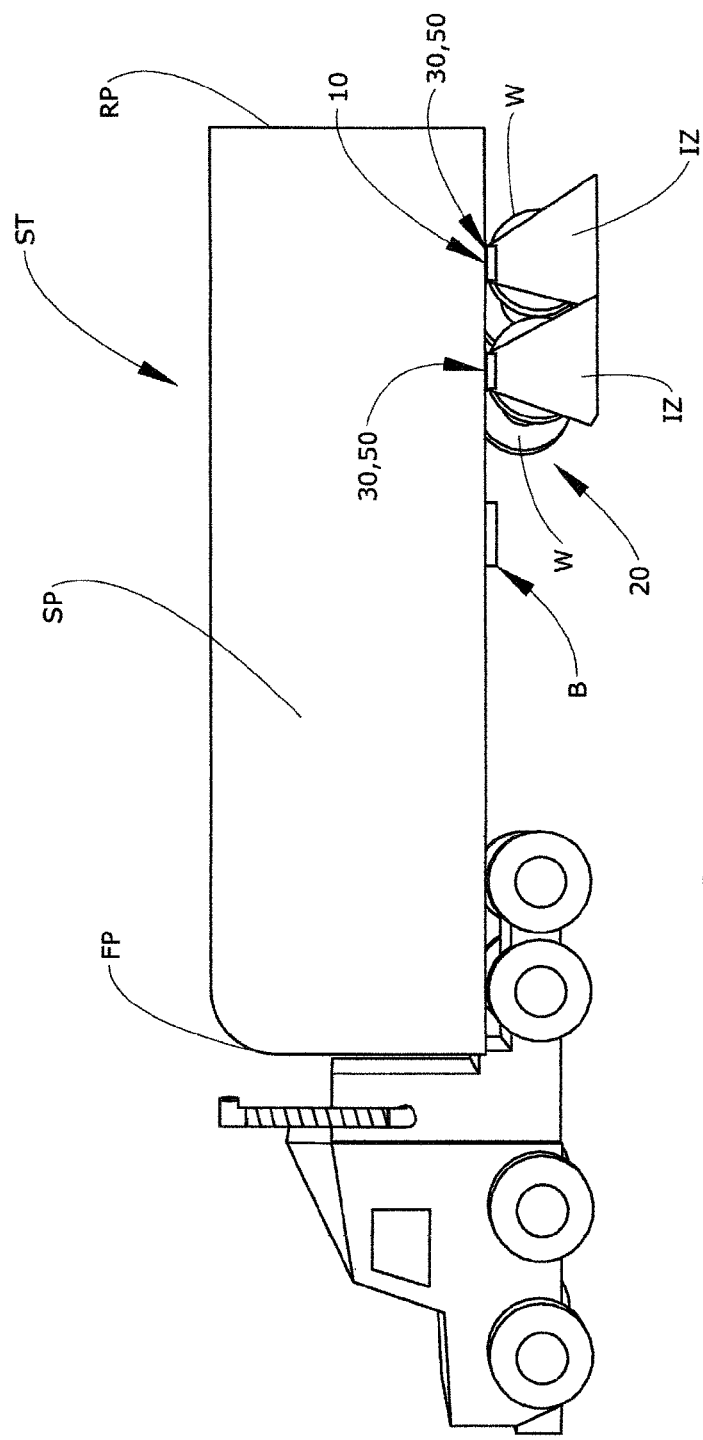
FIG. 1 is a side elevational view of a semi-trailer illustrating a safety lighting system of the present invention mounted to the rear wheel assemblies of a tractor-trailer.
Figure 2:
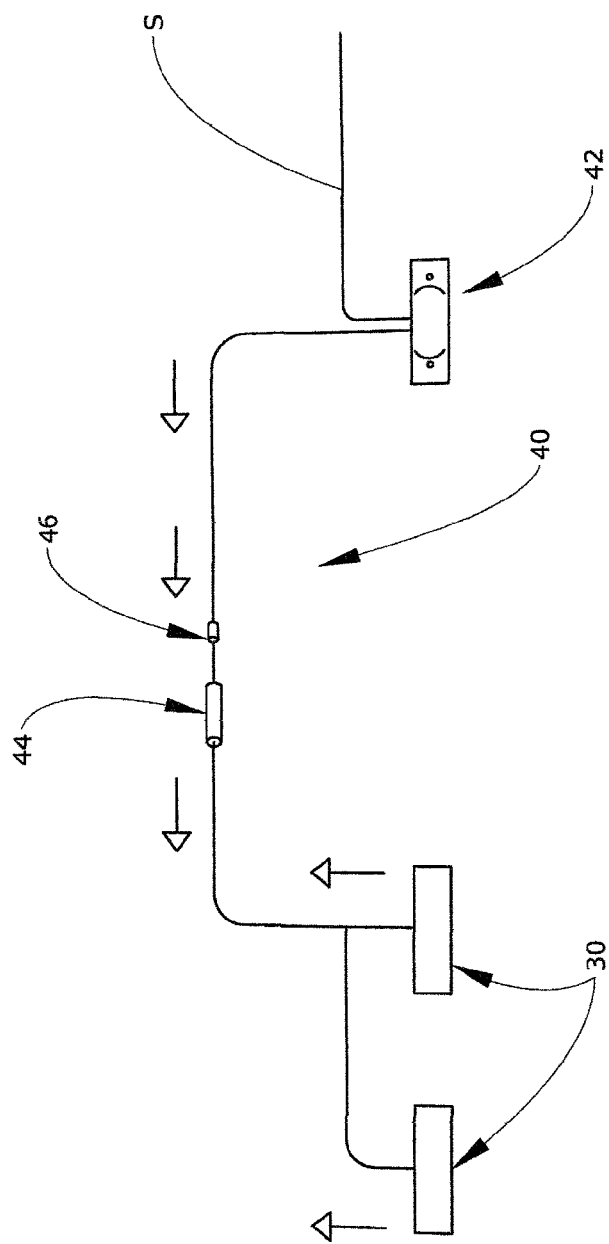
FIG. 2 is a schematic diagram of an example of an electrical circuit used in the safety lighting system of the invention.
Figure 3:
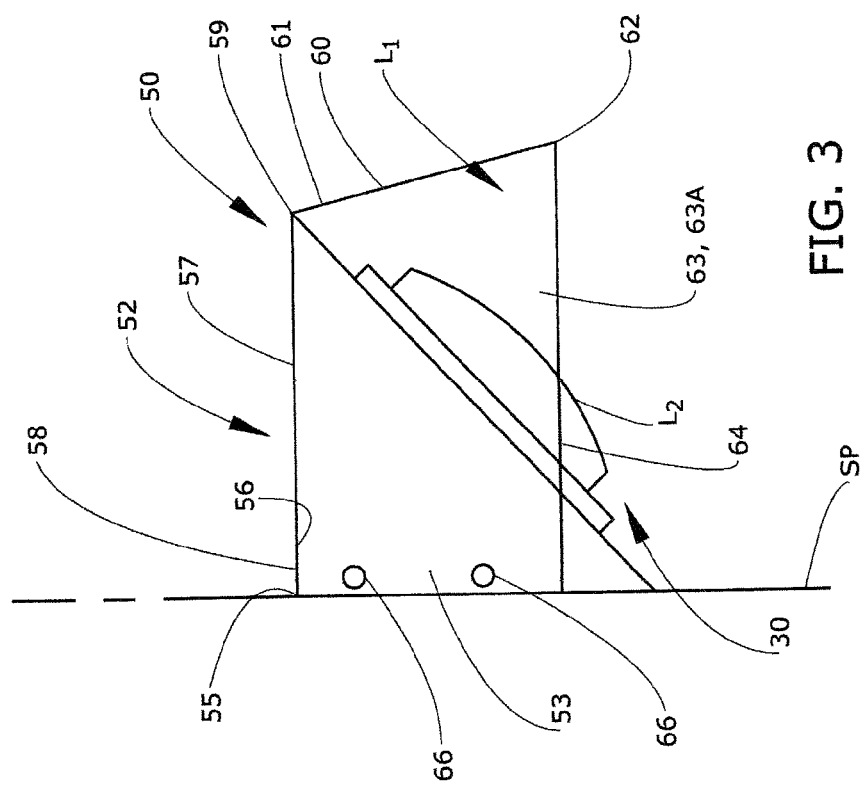
FIG. 3 is a schematic view of a housing assembly with a light generating element of the safety lighting system of the invention.

With particular reference to FIGS. 1, 2 and 3, it can be understood that one aspect of the present invention is embodied in a safety lighting system 10 which is mounted on a semi-trailer truck ST to illuminate the rear wheel area 20 thereof. As used herein, a "semi-trailer truck" is defined as a wheeled vehicle which includes commercial vehicles, including (but not limited to) drop deck, lowboy, R.G.N., specialized (multi-axle), straight trucks, and furniture vans; as well as personal type vehicles, including (but not limited to) single and double axle trailers, bumper pull horse trailers, goose neck trailers, R.V. or pull-behind campers, and roll back type car haulers.

As shown in FIG. 1, truck ST includes two side panels, one of which is shown at reference numeral SP which extends from a front panel FP to a rear panel RP and has at least two wheel assemblies W mounted on a rear axle in a manner well-known to those skilled in the art. In the form shown in FIG. 1, there are at least eight wheels on the rear axle; however, it can be appreciated by those skilled in the art that any number of wheels can be used without departing from the scope of the invention. Safety lighting system 10 includes one or more light generating elements or light sources, one of which is indicated by reference numeral 30, mounted on the vehicle adjacent to the rear tires RT of the vehicle in order to illuminate the areas adjacent to those tires as indicated by illumination zones IZ in FIG. 1. This illuminate zone IZ may span 2' to 3' of ground area surrounding the wheels for added vision for the truck driver. The truck ST also has a hazard flasher or blinker system B located underneath the truck ST as shown in FIG. 1.

In an embodiment of the invention and in the arrangement as illustrated in FIG. 1, the light sources 30 of the safety lighting system 10 of the invention may be electrically activated in conjunction with an existing hazard flasher system or blinker system B of the truck. One form of an electrical connection between the light sources 30 of the safety lighting system 10 is indicated in the circuit diagram 40 of FIG. 2. Circuit diagram 40 shows at least two light-generating element or light sources 30 being connected to a 12 volt power source 42 through a capacitor 44 and a diode 46 which controls current flow in order to prevent current backflow which might override the flasher relay and blinker system B shown in FIG. 1, or blinker $B_1$ shown in FIG. 9, or blinker $B_2$ shown in FIG. 13. It is to be further appreciated that light sources 30 may also selectively be interconnected to the brakes and/or turn signals of the truck ST in a manner appreciated to those skilled in the art.

FIG. 3 shows a housing assembly 50 for mounting and carrying a light generating element or light source 30 of the safety lighting system 10 of the invention. Housing assembly 50 comprises a hood 52 which has the shape of a trapezoidal prism and which hood 52 may be mounted on the truck adjacent to one of the wheels, in a manner discussed herein below. Hood 52 has a first leg 53, a reflective inner surface 56, a first base 57 with a proximal end 58 which is connected to the first leg 53 and a distal end 59 which is spaced away from the first leg 53 of hood 52. Hood 52 further comprises a second leg 60 which has a first end 61 connected to distal end 59 of first base 57 and which second leg 60 extends at an angle with respect to first leg 53 and terminates in a second end 62 that is spaced away from first base 57. Hood 52 further comprises two spaced apart sides 63, 63a. An opening 64 is defined by at least the two spaced apart sides 63, 63a of hood 52 and opening 64 is in a plane that is oriented parallel to first base 57 to open toward a wheel assembly W associated with hood 52 when housing assembly 50 is mounted on truck ST as discussed herein above with reference to FIG. 1.

Still referring to FIG. 3, a light-generating element 30 is mounted in and carried by housing assembly 50 such that the light or illumination which is generated by element 30 is reflected on the inner reflective surface 56 of hood 52 and is caused to travel out of opening 64 of hood 52. This illumination generated by light-generating element 30, such as for example, an LED, is reflected by the reflective inner surface 56 of hood 50 and is directed out of opening 64 and toward wheel RT of truck TS of FIG. 1 as indicated by arrows $L_1$ and $L_2$ in FIG. 3. As particularly shown in FIG. 3, a plurality of mounting elements, such as bolts 66, can be used to secure housing assembly 50 to side panel SP of truck ST (FIG. 1).

Figure 4:
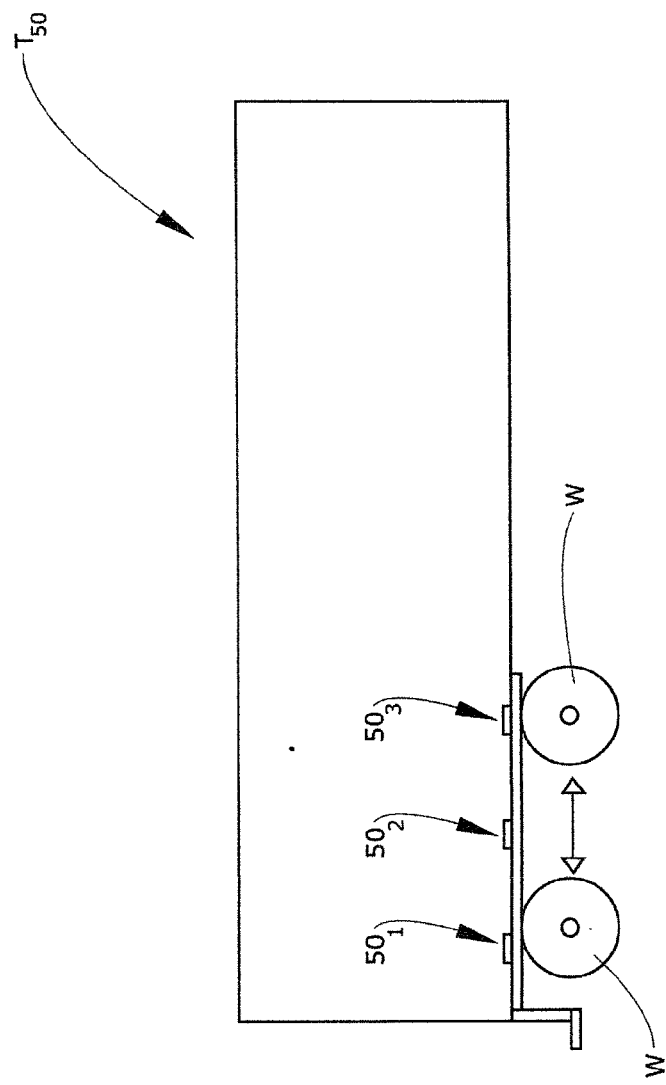
FIG. 4 is a schematic view illustrating an example of an arrangement of the safety lighting system of FIG. 3 on a trailer of a truck.

FIG. 4 illustrates a trailer truck $T_{50}$ having three housing assemblies $50_1$, $50_2$, and $50_3$, which are mounted to a side or underside of the trailer truck $T_{50}$, and which housing assemblies $50_1$, $50_2$, and $50_3$ are similar to housing assembly 50 discussed herein above with reference to FIG. 3. Each assembly $50_1$, $50_2$, and $50_3$ comprises [of] a light generating element 30, and are arranged as shown in FIG. 4 relative to the wheel assemblies W. While not shown in FIG. 4, it is to be appreciated that the opposite side of truck $T_{50}$ may have an identical arrangement of housing assemblies 50 with their respective light generating element 30. Here again, the light generating element 30 of each housing assembly 50 may be interconnected to the hazard flasher or blinker system of the trailer truck and/or to the electrical circuitry of the brakes and/or turn signals in a manner apparent to those skilled in the art.

Figure 5:
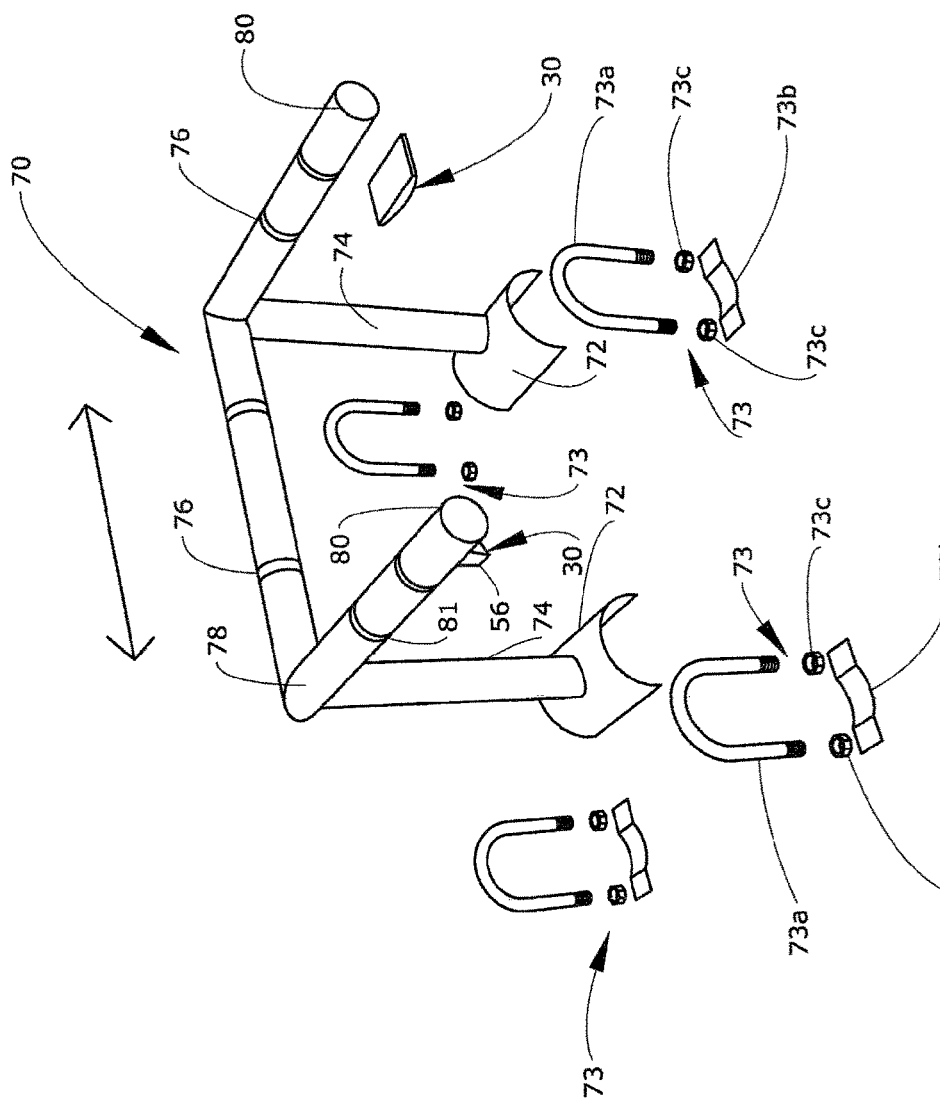
FIG. 5 is an exploded perspective view of a mounting frame for mounting the light mounting assembly of the safety lighting system of the invention to a truck.
Figure 6:
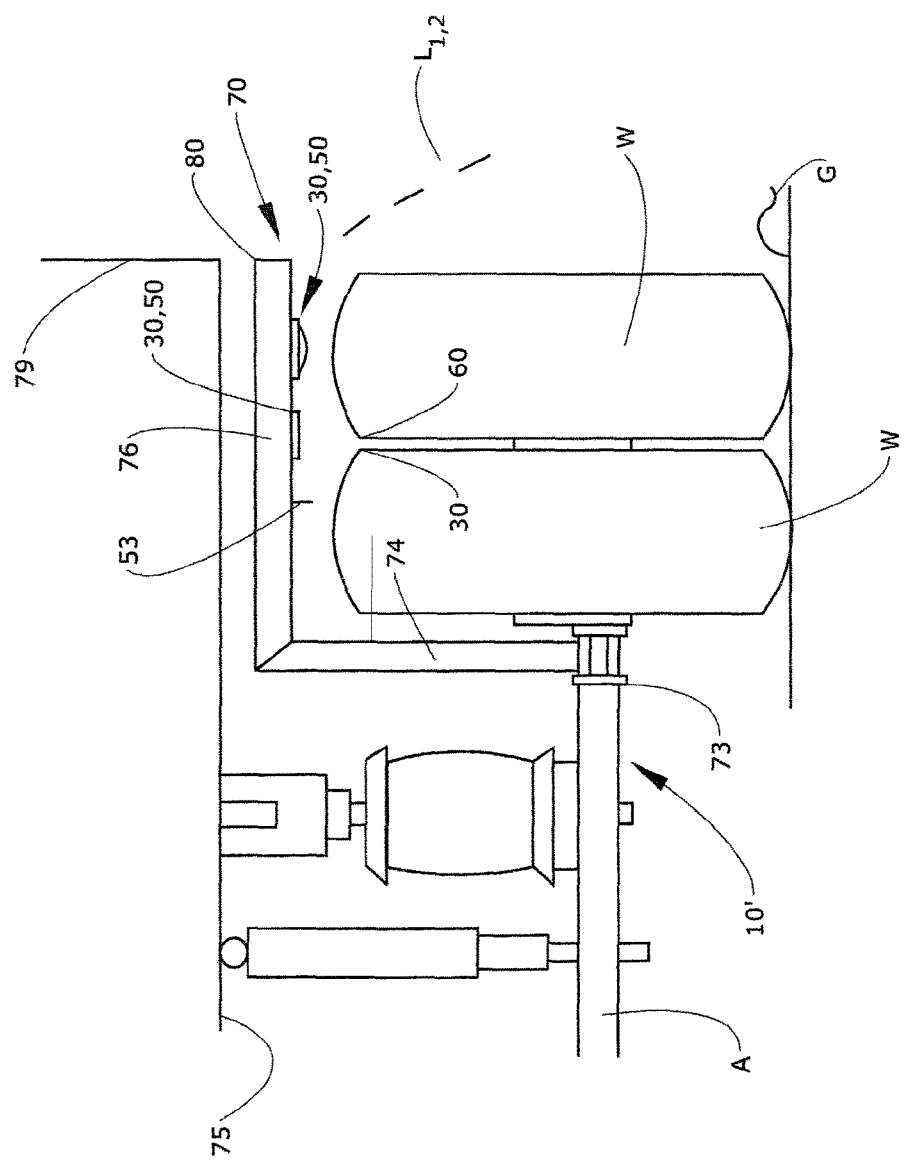
FIG. 6 is a schematic view showing the mounting frame of FIG. 5 mounted to an axle of a truck.
Figure 7:
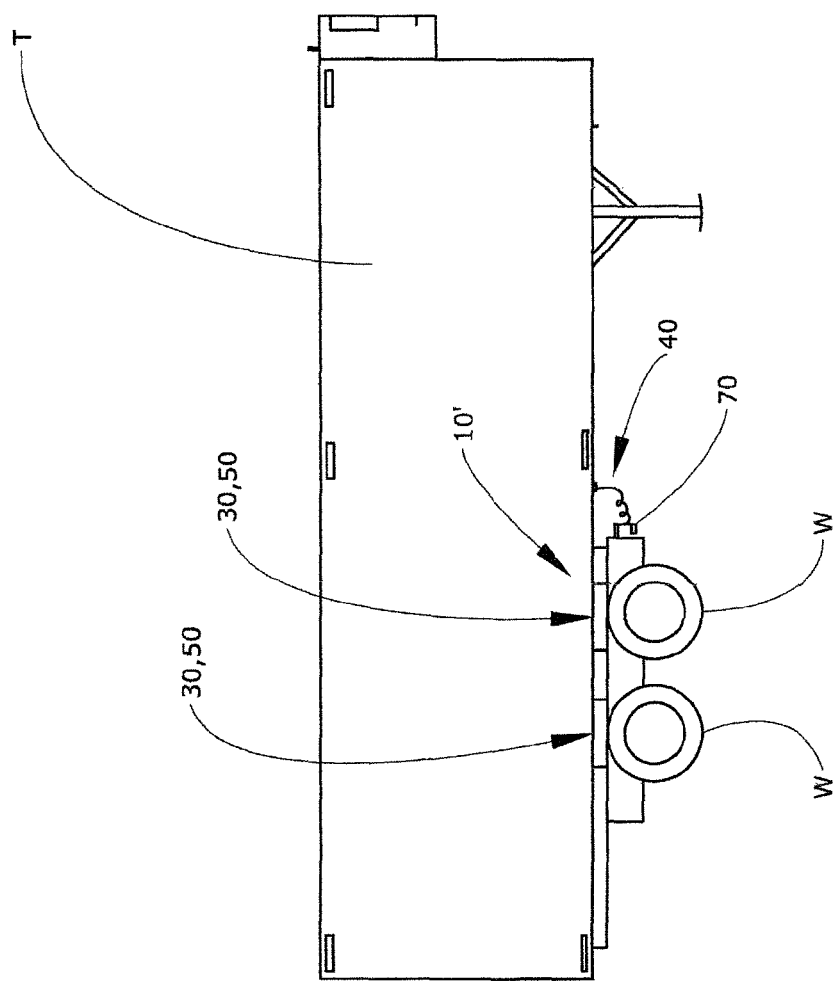
FIG. 7 is a schematic view showing the mounting frame of FIG. 5 positioned relative to the wheels of a truck.

The safety lighting system of the invention may also be mounted on the axles of a tractor-trailer truck as particularly illustrated in FIGS. 5, 6 and 7. As shown in FIG. 6, the safety lighting system 10' is mounted on axle A of a vehicle and is located adjacent to wheel assemblies W of the vehicle via a mounting frame assembly 70. With particular reference to FIG. 5, mounting frame assembly 70 comprises two concave sleeves 72 which are sized to rest on axle A (FIG. 6) and which concave sleeves 72 are attached to axle A via a clamp assembly 73 (FIG. 5). Clamp assembly 73 may be case hardened and consists of a "U" bolt 73a, a bottom clamp 73b, and two lock nuts 73c. Mounting frame assembly 70 further comprises two spaced-apart support risers 74 which extend upwardly. Each support riser 74 is attached to an outrigger arm 76 which in turn extends in a plane parallel to the lower surface 75 of the tractor-trailer truck when the safety lighting system 10' is secured to axle A of the vehicle, as particularly shown in FIG. 6. The components of mounting frame assembly 70 may consist of galvanized metal, such as, steel or aluminum, and risers 74 and outrigger arms may be comprised of galvanized conduits.

Still referring particularly to FIG. 6, outrigger arms 76 are mounted at a proximal end 78 thereof to extend beneath a lower surface 75 and outwardly toward the side 79 of the tractor-trailer truck and to have a distal end 80 thereof located adjacent to wheel assembly W of the truck. Each outrigger arm 76 has a light generating element 30 mounted on an underside surface of the distal end 80 of each outrigger arm 76. Light generating elements 30 may be comprised of a light emitting diode (LED) and may be mounted in and carried by housing assembly 50 described herein above with reference to the safety lighting system 10 of FIGS. 1-3. In this respect, each light generating element 30 of FIGS. 5-7 will be positioned such as to direct its light $L_1$, $L_2$ downwardly toward the ground G adjacent to wheel assemblies W of the truck (FIG. 6). Several fastener ties, such as that indicated by reference numeral 81 in FIG. 5, may be used to attach wiring of an electrical circuit for the safety lighting system 10' to mounting frame assembly 70.

As indicated in the preceding paragraph, the safety lighting system 10' of FIGS. 5-7 may also be comprised of an LED mounted in a housing assembly similar to housing assembly 50 illustrated in FIG. 3. In this instance, a housing assembly 50 with its respective LED 30 would be mounted on each outrigger arm 76 of mounting frame assembly 70 similar to that shown in FIG. 5 with mounting frame assembly 70 mounted on axle A of the truck as shown in FIGS. 6 and 7.

Figure 7A:
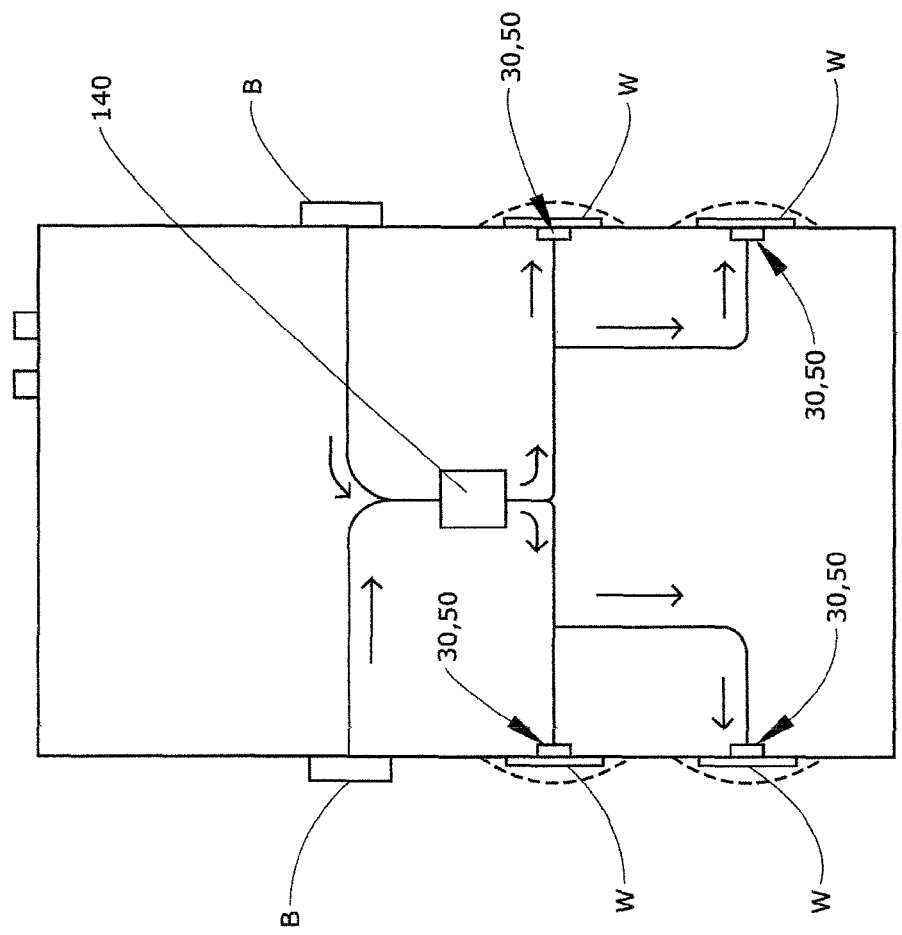
FIG. 7A is a schematic diagram of an example of an electrical circuit for the safety lighting system of the invention illustrated in FIG. 7.

Referring now to FIGS. 7 and 7A, the safety lighting system 10' is comprised of two housing assemblies 50 with a light-generating element 30 being mounted in and carried by each housing assembly 50. These two housing assemblies 50 are mounted over the wheel assemblies W of the trailer T, and in an embodiment of the invention, each light-generating element 30 would be interconnected to a hazard flasher system B located on both sides of the trailer T. The arrangement for this electrical interconnection is schematically illustrated in FIG. 7A. A mounting box 140 is mounted on the trailer T and power from the hazard flasher systems B travels into mounting box 140 and then travels as indicated by the arrows to the first set of light-generating element 30 and housing assembly 50 located on opposite sides of the trailer T and then branches off to the second set of light-generating element 30 and housing assembly 50 located beneath the first set as illustrated in FIG. 7A.

Figure 8:
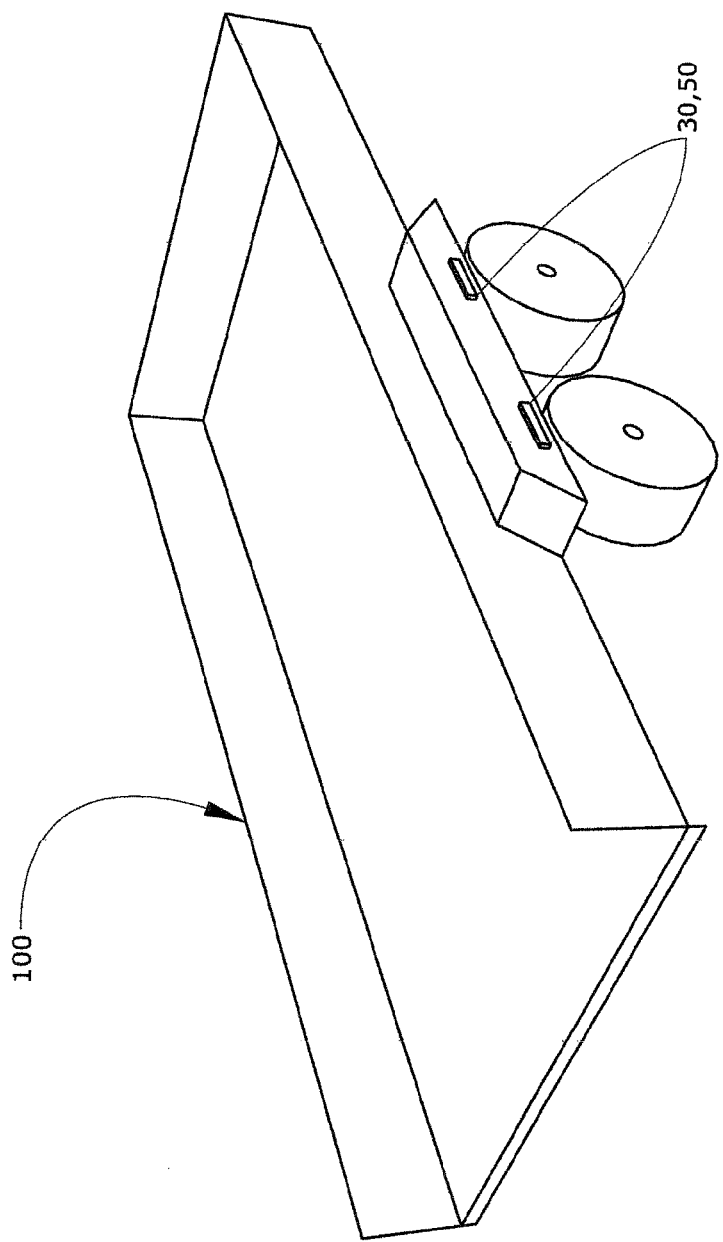
FIG. 8 is a perspective schematic view of a personal type two-axle trailer incorporating the safety lighting system of the invention.
Figure 9:
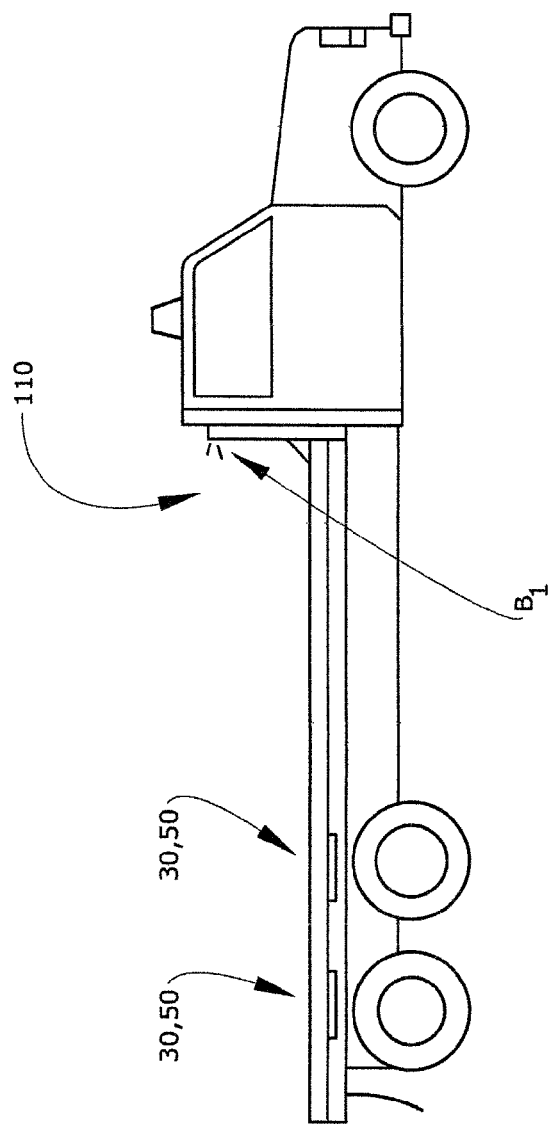
FIG. 9 is a schematic side elevational view of a rollback vehicle incorporating the safety lighting system of the invention.
Figure 10:
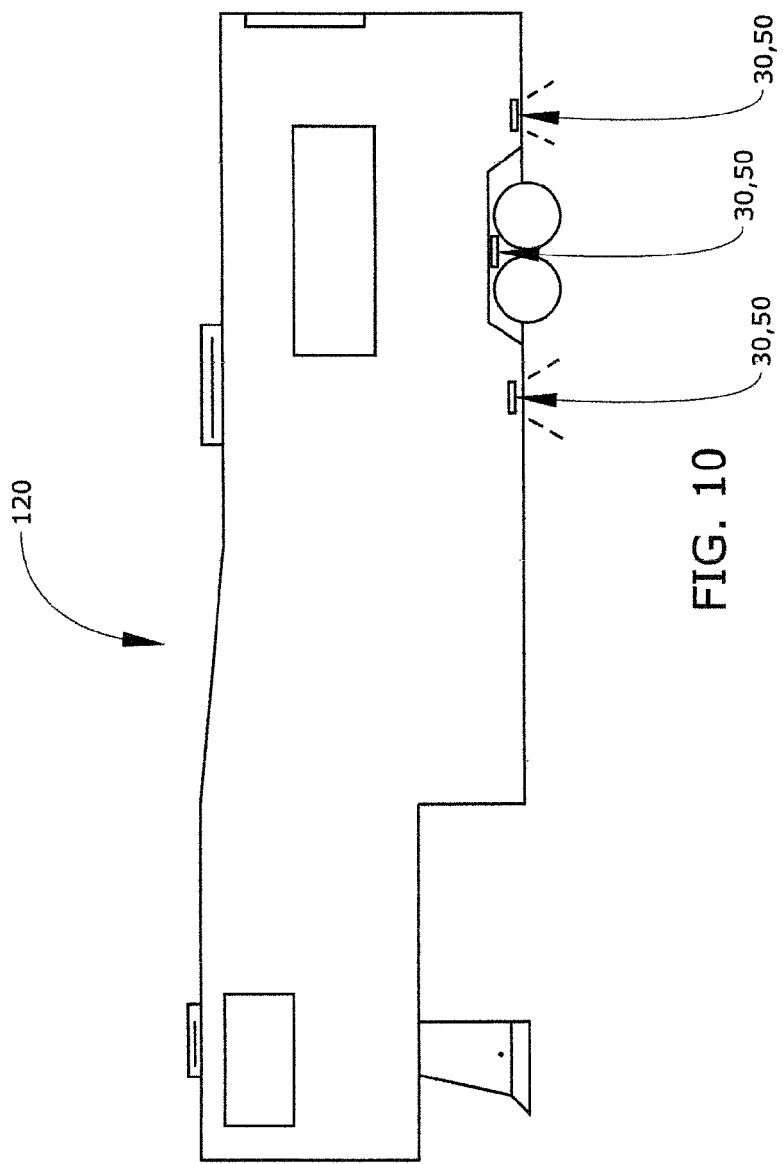
FIG. 10 is a schematic side elevational view of a camper incorporating the safety lighting system of the invention.

LED 30 and its respective housing assembly 50 of the safety lighting system 10 of FIGS. 1-3 and the safety lighting system 10' of FIGS. 5-7 may be used on various types of vehicles, such as, for example, on a personal type two-axle trailer 100 as shown in FIG. 8 by reference numerals 30, 50 designating two such arrangements; or on a straight truck or rollback vehicle 110 shown in FIG. 9 with reference numerals 30, 50 designating two such light arrangements; or on a camper 120 shown in FIG. 10 with reference numeral 50 designating three such light arrangements; or on a heavy-haul trailer 130 shown in FIG. 13 which unlocks and spreads out when the forward brakes are applied and with reference numerals 30, 50 designating two such light arrangement. In the instance of trailer 130 of FIG. 13, slip ties 132 or the like may be provided to secure a circuit 40 similar to that of FIG. 2 to trailer 130. As can be appreciated, in each instance with regard to FIGS. 8-10 and 13, a safety lighting system of the invention comprising a light-generating element 30 such as an LED is carried by a housing assembly 50 as discussed herein above, and the light-generating element 30 may be operated via the circuit of FIG. 2.

An advantage of using LED lights in the invention is that LED lights may provide 10 times more bulb life and do not generate any heat, and in addition, LED lights are generally much brighter than standard filament bulbs. The LEDs may be white or clear and may measure approximately 2 inches by 5 inches.

Figure 11:
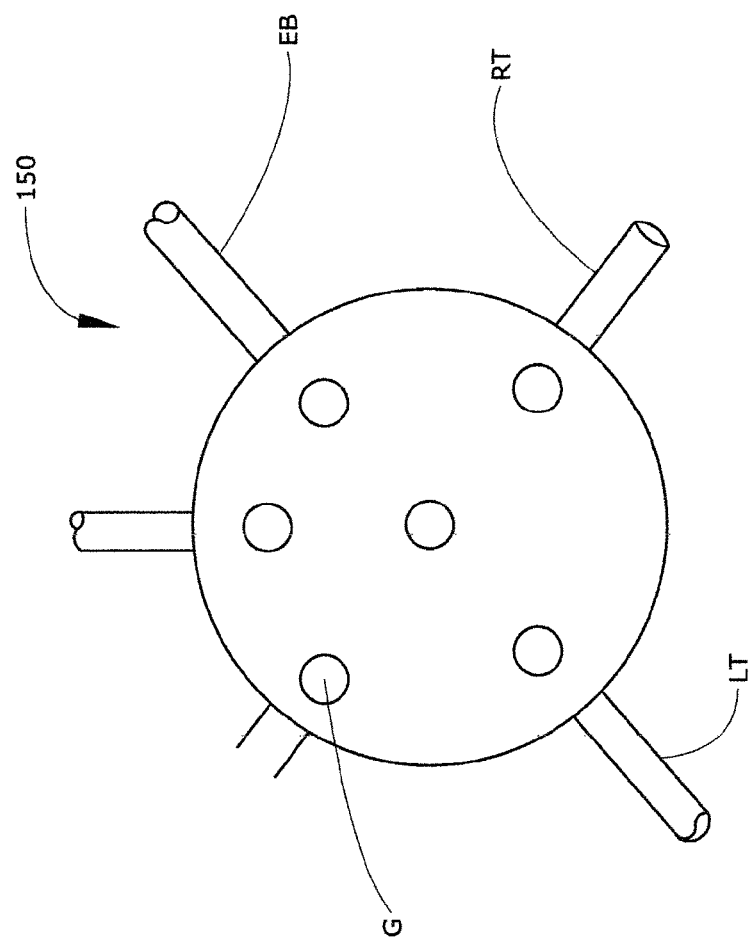
FIG. 11 is a schematic showing a selection switch for incorporation into an electrical circuit for controlling the lights of the safety lighting system of the invention.
Figure 12:
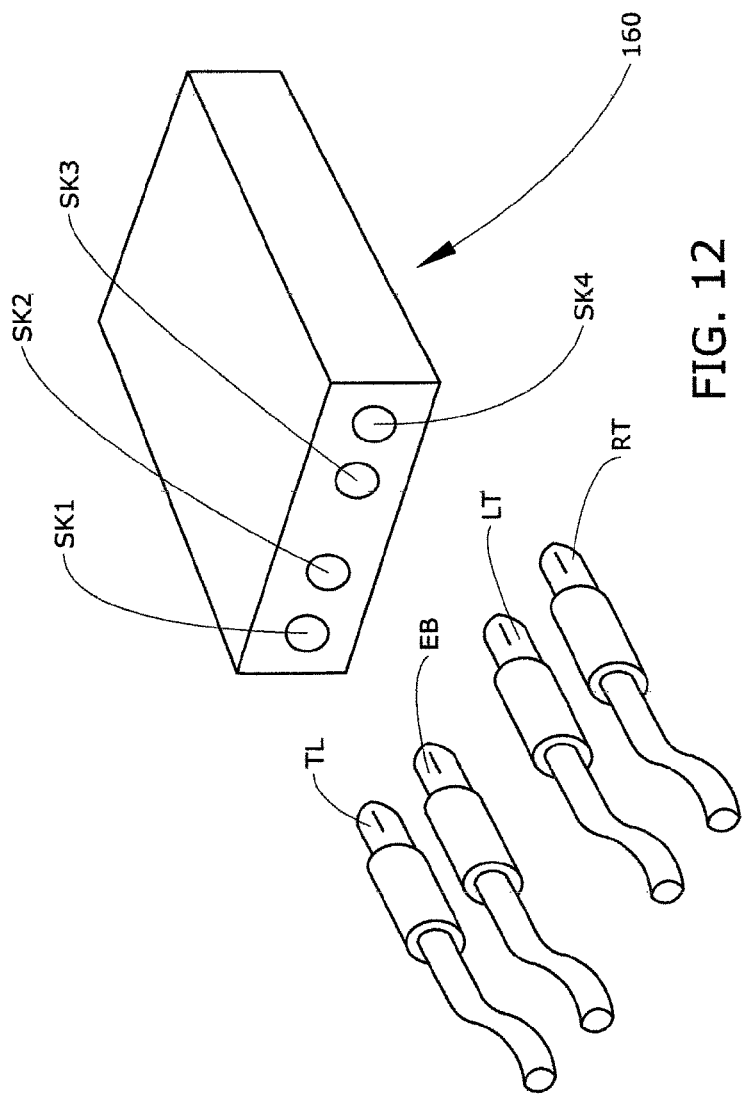
FIG. 12 is an exploded schematic view showing a selection box for incorporation into an electrical circuit for controlling the lights of the safety lighting system of the invention.

As schematically indicated in FIG. 11, circuit 40 of FIG. 2 may comprise a selection switch 150 and/or a selection box 160 as schematically indicated in FIG. 12. These elements can easily be incorporated by one skilled in the art into the electrical system for the safety lighting system of the invention. As indicated in FIG. 11, the selection switch 150 contains electrical connection to the tail lights TL, the electrical brakes EB, the right turn signal RT, the left turn signal LT, and a grounded G connection. Likewise, each of the electrical components of the selection box 160 represents electrical connections similar to that of FIG. 12, that is a plug is provided for the tail lights TL, a plug is provided for the electrical brakes EL, a plug is provided for the right turn signal RT, and a plug is provided for the left turn signal LT. In this latter arrangement, the plugs TL, EL, RT and LT may be colored coded to match corresponding colors of the sockets for easy insertion of the plugs into selection box 160. Since the operation and construction of the selection switch 150 of FIG. 11 and selection box 160 of FIG. 12 are well-known to those skilled in the art, and are not part of the claimed invention, such details need not be discussed herein. The electrical wire used in the invention may be 16 gauges, and the electrical junction box 160 and selection switch 150 may measure approximately 3 feet by 5 feet and made of weatherproof plastic.

The safety lighting system embodying the invention creates ample illumination to the areas existing around the wheel assemblies of a vehicle and achieves the goal of creating a subsequent reaction time that is not present currently. The reaction time will serve to give the driver and other parties, such as a motorist, bicyclist or pedestrian, advance warning of potential impending danger. As discussed herein above, drivers must maneuver and navigate a bus, tractor-trailer or any lengthy trailer by relying on the side mounted rear-view mirrors. This can be difficult at times considering that the rear axles or trailing portion of such vehicles can be 70 feet or more behind the driver's seat. During the day, a driver can readily identify most everything around his vehicle; however, at night or in poor weather conditions, this is done more by "feel" and experience than by precise visual cognition as to the clear tracking direction of the rear of the vehicle. In other words, as a driver operating at night without light to these areas, the driver simply cannot see any part of the vehicle in his mirrors apart from a few amber marker lamps on the vehicle's body. The driver has difficulty seeing whether he is turning the vehicle wide enough to avoid having the trailing axles make contact with the curb, or a pole, or the like. The invention provides adequate illumination and warning needed to safely navigate the rear of the vehicle.

Although the safety lighting system of the invention is practical and helpful in a multitude of everyday circumstances as encountered by drivers of nearly all vehicles, clearly one of the on-highway vehicle applications of the safety lighting system of the invention that is among those who derive the most benefit from the invention are tractor-trailers and combination vehicles. The tractor-trailers can be in combinations of two, three or even four trailers making the tractor-trailer quite lengthy.

Oftentimes, drivers of automobiles inadvertently enter the poorly defined space under a tractor-trailer. This area can be from 26 to 50 feet of open area beneath the trailers. The height of the trailer floor is high enough that smaller cars can easily get wedged under the trailer resulting in serious damage and injuries. This generally occurs when the operator of the tractor-trailer fails to see the smaller car as it passes on the right at highway speeds. The automobile is usually half way around when the truck driver is returning to the right lane and not seeing the automobile. This also may occur when the truck is making right turns. The safety lighting system of the invention when mounted to the trailer at specific locations serves to mitigate many problems by the warning given to the driver of the automobile when the lighting system is activated in conjunction with the tractor-trailer turn signal. The subsequent illumination of the undersides and axle areas of the invention creates immediate visual contact and higher awareness of the position and direction of movement of the trailer portion of the tractor-trailer and discourages close proximity of the passenger vehicle.

The safety lighting system of the present invention can be retrofitted on any trailer, no matter the age. The safety benefits of improved lighting, visibility, and communication of driver intentions make this a valuable product for semi-trailer drivers. More specifically, the safety lighting system of the invention can be used on commercial vehicles, including (but not limited to) drop deck, lowboy, R.G. N., specialized (multi-axle), straight trucks, or furniture vans; as well as personal type vehicles, including (but not limited to) single/double axle trailers, bumper pull horse trailers, goose neck trailers, R.V. or pull-behind campers, and roll back type car haulers.

From the above, it can be appreciated that the invention comprises a safety lighting system which is connected to an existing lighting system of the vehicle, such as, for example, the brakes, the turn signals and/or the blinker/hazard flasher system of a vehicle wherein one or more lights of the safety lighting system of the invention come on when one or more of the components, such as, the brakes, turn signals, and/or blinker/hazard flasher system are activated.

While the present invention has been described in connection the preferred embodiments of the various figures, it is to be understood that other similar embodiments may be used or modifications and additions may be made to the described embodiment for performing the same function of the present invention without deviating therefrom. Even though the safety lighting system has been described in conjunction with a mounting frame assembly 70 attached to an axle of a vehicle, it is to be appreciated that housing assembly 50 and light source 30 of the safety lighting system 10 may simply be mounted on the underside of the tractor trailer or truck, or on the exposed floor beams directly above or in the area above the wheel assemblies of the tractor trailer or truck. Accordingly, it is intended by the appended claims to cover all such changes and modifications as come within the spirit and scope of the invention.

What is claimed is:

1. A safety lighting system for a vehicle having a lighting system, comprising:
   an electrical circuitry for connecting the safety lighting system to the lighting system of the vehicle for activation of the safety lighting system when one or more components of the lighting system of the vehicle are activated;

a housing assembly having a reflective inner surface, and comprising:
a first leg;
a first base having a proximal end connected to the first leg and a distal end spaced away from the first leg;
a second leg having a first end connected to the distal end of the first base and extending at an angle with respect to the first leg;
the second leg having a second end spaced away from the first base; and
two spaced-apart sides connected to the first leg, the first base, and the second leg defining an opening in the housing assembly;
a light-generating element mounted in the opening of the housing assembly and connected to the electrical circuitry for activation thereof when one or more components of the existing lighting system of the vehicle are activated, the illumination from the light-generating element being reflected by the reflective inner surface of the housing assembly and directed out of the opening of the housing assembly and towards the wheel assembly of the vehicle; and
a mounting frame assembly for supporting the housing assembly and for positioning the safety lighting system underneath the vehicle in proximity to the wheel assembly of the vehicle,
the mounting frame assembly comprising:
at least two concave sleeves each structured to rest on an axle of the vehicle;
a clamping assembly for attaching each of the concave sleeves to an axle of the vehicle;
at least two support riser elements, each support riser element being associated with one of the concave sleeves; and
an outrigger arm associated with each support riser element and having a proximal end mounted to its associated support riser element and structured to extend beneath a lower surface of the vehicle and toward the wheel assembly of the vehicle, each outrigger arm having a distal end located adjacent to the wheel assembly of the vehicle;
the housing assembly and its associated light-generating element being mounted on the distal end of each outrigger arm for directing illumination downwardly toward the wheel assembly of the vehicle and onto the ground.

2. The safety lighting system of claim 1, wherein the opening defined in the housing assembly is located in a plane oriented parallel to the first base of the housing assembly.

3. The safety lighting system of claim 1, wherein the light-generating element is oriented at an oblique angle with respect to the first leg of the housing assembly.

4. The safety lighting system of claim 1, wherein the light-generating element is comprised of a light emitting diode.

5. The safety lighting system of claim 1, further comprising an electrical selection box for selectively interconnecting the safety lighting system to a hazard flasher system, the braking system, and the turn signals of the vehicle.

6. The safety lighting system of claim 1, further comprising a selection switch for activating the safety lighting system simultaneously and selectively with a hazard flasher system, the braking system, and the turn signals of the vehicle.

7. A safety lighting system for a vehicle having a lighting system, comprising:
a light-generating element;
an electrical circuitry for connecting the safety lighting system to the lighting system of the vehicle for activation of the safety lighting system when one or more components of the existing lighting system of the vehicle is activated; and
a mounting frame assembly for supporting the light-generating element and for positioning the light-generating element in association with an axle of a wheel assembly of the vehicle;
the mounting frame assembly comprising;
at least two concave sleeves each structured to be supported by the axle of the vehicle;
a clamping assembly for attaching each of the concave sleeves to the axle of the vehicle;
at least two support riser elements, each support riser element being associated with one of the concave sleeves; and
an outrigger arm associated with each support riser element and having a proximal end mounted to its associated support riser element and structured to extend beneath a lower surface of the vehicle and toward the wheel assembly of the vehicle, each outrigger arm having a distal end located adjacent to the wheel assembly of the vehicle;
the light-generating element being mounted on the distal end of each outrigger arm for directing a light beam downwardly toward the wheel assembly of the vehicle and onto the ground.

8. The safety lighting system of claim 7, wherein the light-generating element is comprised of a light emitting diode.

9. The safety lighting system of claim 7, further comprising an electrical selection box for selectively interconnecting the safety lighting system to a hazard flasher system, the braking system, and the turn signals of the vehicle.

10. The safety lighting system of claim 7, further comprising a selection switch for activating the safety lighting system selectively with a hazard flasher system, the braking system, and the turn signals of the vehicle.

* * * * *